(12) United States Patent
Laemmle et al.

(10) Patent No.: US 11,498,437 B2
(45) Date of Patent: Nov. 15, 2022

(54) INDUCTIVE CHARGING SYSTEM WITH MODULAR UNDERGROUND PROTECTION

(71) Applicant: Mahle International GmbH, Stuttgart (DE)

(72) Inventors: Christopher Laemmle, Stuttgart (DE); Florin Moldovan, Stuttgart (DE); Markus Watzlawski, Esslingen (DE)

(73) Assignee: Mahle International GmbH

( * ) Notice: Subject to any disclaimer, the term of this patent is extended or adjusted under 35 U.S.C. 154(b) by 407 days.

(21) Appl. No.: 16/673,940

(22) Filed: Nov. 4, 2019

(65) Prior Publication Data

US 2020/0139829 A1 May 7, 2020

(30) Foreign Application Priority Data

Oct. 21, 2019 (DE) .................. DE102019216140.5

(51) Int. Cl.
| | |
|---|---|
| *B60L 53/12* | (2019.01) |
| *H02J 7/02* | (2016.01) |
| *H02J 5/00* | (2016.01) |
| *H01F 38/14* | (2006.01) |
| *H01F 27/28* | (2006.01) |
| *H01F 27/24* | (2006.01) |

(Continued)

(52) U.S. Cl.
CPC .............. *B60L 53/12* (2019.02); *H01F 27/24* (2013.01); *H01F 27/288* (2013.01); *H01F 27/2876* (2013.01); *H01F 27/36* (2013.01); *H01F 27/361* (2020.08); *H01F 38/14* (2013.01); *H02J 5/005* (2013.01); *H02J 7/025* (2013.01); *H02J 50/005* (2020.01); *H02J 50/10* (2016.02)

(58) Field of Classification Search
CPC .. B60L 53/12; B60L 2270/147; B60L 53/302; H01F 27/24; H01F 27/2876; H01F 27/288; H01F 27/36; H01F 27/361; H01F 38/14; H01F 27/02; H02J 5/005; H02J 7/025; H02J 50/005; H02J 50/10; H02J 50/70; Y02T 10/70; Y02T 10/7072; Y02T 90/12; Y02T 90/14
See application file for complete search history.

(56) References Cited

U.S. PATENT DOCUMENTS

| | | | | |
|---|---|---|---|---|
| 1,840,780 A | * | 1/1932 | Jones .................. | H01F 27/363 336/84 R |
| 9,325,187 B2 | * | 4/2016 | Lee ...................... | H01F 27/366 |

(Continued)

FOREIGN PATENT DOCUMENTS

| | | |
|---|---|---|
| CN | 212162859 U | * 12/2020 |
| DE | 102011115092 A1 | 4/2013 |

(Continued)

OTHER PUBLICATIONS

English abstract for DE-102011115092.
English abstract for DE-102017207266.

*Primary Examiner* — Stacy Whitmore
(74) *Attorney, Agent, or Firm* — Fishman Stewart PLLC

(57) ABSTRACT

An induction charging device for an electrically operated vehicle may include a sub-surface protection, a shield element, and an induction charging module. The shield element may include a recess. The sub-surface protection may include a receiving area. The recess and the receiving area may define an insertion area in which the induction charging module is arranged.

20 Claims, 3 Drawing Sheets

(51) Int. Cl.
  H01F 27/36 (2006.01)
  H02J 50/00 (2016.01)
  H02J 50/10 (2016.01)

(56) References Cited

U.S. PATENT DOCUMENTS

| | | | | |
|---|---|---|---|---|
| 10,250,061 | B1* | 4/2019 | Bank | H02J 7/007184 |
| 10,650,952 | B2* | 5/2020 | Laemmle | H02J 7/025 |
| 10,875,412 | B1* | 12/2020 | MacGregor | B60L 53/12 |
| 10,875,413 | B2* | 12/2020 | Birkholz | H02J 50/10 |
| 2013/0033227 | A1* | 2/2013 | Gibbons, Jr. | B60L 53/38 320/108 |
| 2013/0249477 | A1* | 9/2013 | Keeling | H01F 41/00 320/108 |
| 2013/0313249 | A1 | 11/2013 | Cregut et al. | |
| 2014/0091757 | A1* | 4/2014 | Proebstle | B60L 53/126 320/108 |
| 2014/0327391 | A1* | 11/2014 | Niederhauser | B60L 53/124 320/108 |
| 2015/0022020 | A1* | 1/2015 | Borngraber | H02J 50/70 307/104 |
| 2015/0197155 | A1* | 7/2015 | Lu | B60L 53/12 320/108 |
| 2015/0262750 | A1* | 9/2015 | Blum | H02J 50/10 320/108 |
| 2015/0302971 | A1* | 10/2015 | Wagman | H01F 41/041 336/200 |
| 2015/0326062 | A1* | 11/2015 | Gonzalez Valdez | H02J 7/042 320/108 |
| 2016/0172105 | A1 | 6/2016 | Berg et al. | |
| 2016/0176299 | A1* | 6/2016 | Kautz | H02J 50/10 307/104 |
| 2017/0093198 | A1* | 3/2017 | Graham | H02J 7/0044 |
| 2017/0097437 | A1* | 4/2017 | Widmer | H02J 50/80 |
| 2017/0259677 | A1 | 9/2017 | Stewing et al. | |
| 2018/0061564 | A1* | 3/2018 | Leem | H01F 27/36 |
| 2018/0069601 | A1* | 3/2018 | Qiu | H02J 50/402 |
| 2018/0366265 | A1* | 12/2018 | Jang | H01F 27/02 |
| 2019/0006826 | A1* | 1/2019 | Islinger | B60L 55/00 |
| 2019/0044563 | A1* | 2/2019 | Thiel | H04B 1/3888 |
| 2019/0103764 | A1* | 4/2019 | Marshall | G06F 1/1635 |
| 2019/0111792 | A1* | 4/2019 | Haynes | H02J 50/10 |
| 2019/0118663 | A1* | 4/2019 | Chabaan | H02J 50/12 |
| 2019/0125074 | A1* | 5/2019 | Cheng | H02M 3/137 |
| 2019/0131803 | A1* | 5/2019 | Cong | H02J 7/085 |
| 2019/0173317 | A1* | 6/2019 | Zaheer | H02J 50/70 |
| 2019/0184841 | A1* | 6/2019 | Van Wiemeersch | B60L 53/38 |
| 2019/0225098 | A1* | 7/2019 | Helm | B60K 1/04 |
| 2019/0255962 | A1* | 8/2019 | Vare | B60L 53/302 |
| 2019/0308514 | A1* | 10/2019 | Parimi | B64C 39/024 |
| 2020/0044484 | A1* | 2/2020 | Lee | H02J 50/10 |
| 2020/0139828 | A1* | 5/2020 | Laemmle | H02J 50/12 |
| 2020/0157761 | A1* | 5/2020 | Park | H02J 50/70 |
| 2020/0198483 | A1* | 6/2020 | Laemmle | B60L 53/12 |
| 2020/0315307 | A1* | 10/2020 | Foreman | H02J 50/12 |
| 2020/0373072 | A1* | 11/2020 | Leem | H01F 38/14 |
| 2021/0114471 | A1* | 4/2021 | Ye | H01F 27/02 |
| 2021/0337319 | A1* | 10/2021 | Narampanawe | H02J 50/005 |
| 2021/0384749 | A1* | 12/2021 | Liao | H02J 7/0068 |

FOREIGN PATENT DOCUMENTS

| | | |
|---|---|---|
| DE | 102014218067 A1 | 3/2016 |
| DE | 102017207266 A1 | 10/2018 |
| EP | 3224843 A1 | 10/2017 |

* cited by examiner

INDUCTIVE CHARGING SYSTEM WITH MODULAR UNDERGROUND PROTECTION

CROSS-REFERENCE TO RELATED APPLICATIONS

This application claims priority to German Patent Application No. DE 10 2018 218 840.8, filed on Nov. 5, 2018 and German Patent Application No. DE 10 2019 216 140.5, filed on Oct. 21, 2019, the contents of both of which are incorporated herein by reference in their entirety.

TECHNICAL FIELD

The present invention relates to an induction charging device for an electrically operated vehicle.

BACKGROUND

To increase the acceptance of electrically driven vehicles among end customers, it can be advantageous when the energy transfer between a stationary energy source and an energy storage device of the vehicle takes place in a contact-free manner. A contact-free energy transfer is advantageous for end customers, because charging cables, for example, do not need to be brought along or be carried, respectively. Stationary induction charging stations can furthermore be partially buried in the bottom area, so that a better integration in a cityscape or landscape is possible. Buried induction charging stations are further particularly well protected against damages caused by vandalism.

A stationary induction charging station, which is connected to a stationary energy source, can generate a time-varying magnetic field via a primary coil. The electrically operated vehicle has an induction charging device, which comprises an induction coil. If the induction charging device is positioned in the area of the magnetic field of the stationary induction charging station, the time-varying magnetic field induces an alternating current or an alternating voltage, respectively, in the induction coil of the induction charging device. This inducted alternating current or this induced alternating voltage, respectively, can be used to charge the energy storage device of the vehicle.

Compared to commercial vehicles, the available installation space for an induction charging device is highly limited in the case of passenger cars. In addition to the actual energy transfer, however, the induction charging device should in many cases also have a certain electromagnetic compatibility, comprise a thermal management for guiding heat flows, have a weight, which is as low as possible, as well as provide a mechanical protection against external influences for mechanically sensitive components.

The large number of vehicle models further has the result that the induction charging device has to be adapted or designed accordingly, respectively, for the respective vehicle, and increases the development costs. The induction charging device should thus be capable of being used for a plurality of vehicle models, wherein the development effort should be limited to a minimum.

SUMMARY

Within the stress ratio of these demands, the invention at hand has the object of specifying an induction charging device of the above-mentioned type, which is embodied in a particularly advantageous manner for the use in passenger vehicles.

This problem is solved according to the invention by means of the subject matter of the independent claim(s). Advantageous embodiments are subject matter of the dependent claim(s).

The present invention is based on the general idea that the induction charging device has an induction charging module, which, in a standardized design, can be used in a plurality of vehicles, wherein the induction charging module can be connected to a sub-surface protection and a shield element in a standardized manner, wherein the sub-surface protection and the shield element are individually adapted to the requirements of the respective vehicle.

The induction charging device according to the invention has a sub-surface protection, a shield element, as well as an induction charging module. The contact-free energy transfer between a stationary energy source or a stationary induction charging station, respectively, and an energy storage device of the vehicle takes place via the induction charging module.

The sub-surface protection protects the components of the induction charging device, in particular of the induction charging module, against atmospheric influences and mechanical influences. The sub-surface protection can be made of a fiber-plastic composite, in the case of which reinforcement fibers are embedded in a plastic matrix, wherein glass fibers can preferably be used as reinforcement fibers, because they are not electrically conductive and are thus electromagnetically neutral.

The shield element, which can be embodied as shield plate, serves the purpose of electromagnetic shielding, because magnetic and electric field emissions are created in response to the energy transfer, the field strength of which increases with the charging capacity. To prevent damage to components of the vehicle, in particular to electrical components, the shield element can be made of an electrically conductive material, wherein the thickness of the shield element can correspond to at least a skin depth, which the magnetic and electric field emissions can have in the case of a specified frequency of the energy transfer for the electrically conductive material of the shield element. The shield element can be made, for example, of aluminum. The shield element can be non-releasably connected to the sub-surface protection by means of a substance-to-substance bond (for example by means of injection molding or impact extrusion) or also releasably by means of a screw connection.

The shield element has a recess, the sub-surface protection has a receiving area. The recess and the receiving area form an insertion area, in which the induction charging module is arranged. The recess can correspond at least to the dimensions of the induction charging module. The receiving area of the sub-surface protection can be embodied as depression, which extends in the direction of the vehicle floor in an installation position of the sub-surface protection in a vehicle. The depression can have a depth, so that the induction charging module can be arranged in the insertion area at least partially or also completely. The recess and the receiving area can be arranged in alignment with one another.

The insertion area as well as the induction charging module are configured so as to be standardized for a plurality of vehicles, wherein the dimensions of the sub-surface protection and of the shield element can be selected, depending on the requirements of the vehicle. The development as well as the production of the induction charging device is simplified thereby, wherein essentially only the sub-surface protection and the shield element require a corresponding adaptation, so that the production costs of the induction charging device are reduced significantly.

In the case of an advantageous further development of the solution according to the invention, it is provided that the induction charging module has a housing comprising a cover and a bottom, wherein at least one induction coil is arranged inside the housing. The induction coil can be connected to an electronic module in an electrically conductive manner. The induction coil can be configured as helical flat coil or circular coil or as double-D coil. The induction coil can be configured of flexible coil wires. The induction coil can be made at least partially of copper.

In an installation position of the induction charging module, the bottom can be arranged so as abut on the sub-surface protection. The bottom can be made of a fiber-plastic composite, in the case of which reinforcement fibers are embedded in a plastic matrix, wherein glass fibers can preferably be used as reinforcement fibers, because they are not electrically conductive and are thus electromagnetically neutral.

The cover can be embodied to be electromagnetically shielding at least in part. For this purpose, the cover can be made of an electrically conductive material, wherein the thickness of the cover can correspond to at least a skin depth, which the magnetic and electric fields can have in the case of a specified frequency of the energy transfer for the eclectically conductive material of the cover. The cover can be made, for example, of aluminum.

In the case of a further advantageous embodiment of the solution according to the invention, it is provided that the bottom of induction charging module at least partially forms a coil carrier. A particularly compact setup of the induction charging module or of the induction charging device, respectively, is made possible thereby. The induction coil can at least partially be received by the coil carrier, so that the position thereof is fixed essentially relative to the bottom.

In the case of an advantageous further development of the solution according to the invention, it is provided that at least one magnetic field conductor or a field guidance, respectively, is arranged between the induction coil of the induction charging module and the cover of the induction charging module.

The magnetic field conductor conducts the magnetic field in a suitable manner and thus increases the efficiency of the energy transfer and additionally shields the vehicle essentially against time-varying magnetic fields of the induction charging station by neglecting stray fields. Compared to air, the magnetic field conductor has a higher magnetic permeability and can at least partially be made of ferrimagnetic and/or ferromagnetic materials. The magnetic field conductor can be configured of one plate element or also of a plurality of plate elements.

In the case of a further advantageous embodiment of the solution according to the invention, it is provided that a shield unit is arranged between the magnetic field conductor of the induction charging module and the cover of the induction charging module. This shield unit initially protects electronic components, in particular an electronic module of the induction charging module, against electromagnetic fields, which can lead to a destruction of the electronic components. The shield unit, together with the shield element, further protects the further electronic components of the vehicle against the resulting electromagnetic fields and against unwanted heat-up.

In the case of an advantageous further development of the solution according to the invention, it is provided that a cooling element, through which a fluid can flow, is arranged between the magnetic field conductor of the induction charging module and the cover of the induction charging module. The cooling element can be embodied in one piece or also in several pieces. It can be provided that an electronic module of the induction charging module and/or the magnetic field conductor and/or the induction coil is connected to the cooling element in a thermally conductive manner via a heat conducting element, wherein, compared to air, the heat conducting element has a lower thermal resistance. The heat conducting element can, for example, be an adhesive comprising a high heat conductivity. The heat conducting element can be a heat conducting film and/or a heat conducting paste and/or a heat conducting casting compound.

An overheating of the induction charging module is prevented due to such an active cooling by means of a cooling element, through which fluid can flow, so that the induction charging module can be charged with a maximum charging capacity at any operating point, without requiring a power throttling.

The cooling element can have a cooling element cover and a cooling element bottom, wherein at least a first cooling element subcomponent, which is embodied, for example, as duct-forming plate, can be provided between the cooling element cover and the cooling element bottom. A first cooling element subcomponent and a second cooling element subcomponent, which are configured, for example, as duct-forming plates, can also be provided between the cooling element cover and the cooling element bottom.

In the case of a further advantageous embodiment of the solution according to the invention, it is provided that the shield unit of the induction charging module at least partially forms the cooling element, through which fluid can flow, so as to provide for a setup, which is as compact as possible, of the induction charging module or in the induction charging device, respectively. The cooling element and the shield unit can represent one component comprising two functions.

In the case of an advantageous further development of the solution according to the invention, it is provided that an electronic module is arranged between the shield unit of the induction charging module and the cover of the induction charging module. The electronic module can have, for example, a power electronic unit and/or a control unit and/or a communication unit.

In the case of a further advantageous embodiment of the solution according to the invention, it is provided that the induction charging module has a fluid inlet and a fluid outlet, which are fluidically connected to the cooling element. Via the fluid inlet, a fluid, in particular a coolant or refrigerant, can flow through the cooling element and can absorb the heat created in the induction charging module and remove it via the fluid outlet. The induction charging module or the cooling element, respectively, can be connected to a fluid circuit, which has at least one conveying device for conveying the fluid.

In the case of an advantageous further development of the solution according to the invention, it is provided that the induction charging module has at least one voltage connection and/or at least one communication connection. The voltage connection can be attached in an electrically conductive manner to a battery unit of the vehicle and/or an on-board charger of the vehicle. The communication connection can be connected to a control unit of the vehicle so as to communicate therewith. The voltage connection and/or the communication connection can be connected in an electrically conductive manner to and/or so as to communicate with the electronic module inside the induction charging module.

A communicating connection is to be understood in such a way here that a bidirectional or unidirectional data connection, by means of which electric control, regulating and/or measuring signals in analog or digital form can be transferred, can be provided between two components, which are connected to one another so as to communicate. The communication can be realized by means of a bus system or can also take place wirelessly, in particular a communication via a WLAN interface can be provided thereby.

In the case of a further advantageous embodiment of the solution according to the invention, it is provided that the housing of the induction charging module is configured so as to be thermally insulating. A housing can be considered to be thermally insulating, when its heat conductivity is less than 8 W/(mK), in particular when its heat conductivity is less than 0.6 W/(mK). In the case of this embodiment, an essential portion of the waste heat of the induction charging module can be recovered via a fluid circuit, so that the overall effectiveness of the system is increased. The recovered waste heat can be used, for example, to air-condition the vehicle, of a battery unit, or can also be collected in a thermal storage device. The thermal losses can additionally be reduced by means of the sub-surface protection.

The thermally insulating effect can additionally also be reinforced or supported, respectively, by means of the sub-surface protection. The housing, in combination with the sub-surface protection, can thus thermally insulate the induction charging device. The waste heat can thus be used and the effectiveness/the efficiency of the induction charging device can be increased.

In the case of an advantageous further development of the solution according to the invention, it is provided that the sub-surface protection has reinforcing elements. The reinforcing elements can be configured, for example, as reinforcing beads and/or as reinforcing ribs and/or as reinforcing grids. The reinforcing elements can at least partially be embodied integrally by the sub-surface protection.

In the case of a further advantageous embodiment of the solution according to the invention, it is provided that the sub-surface protection is made of glass fiber-reinforced plastic, in order to attain a highest possible mechanical stability with a dead weight of the induction charging module, which is as low as possible.

In the case of an advantageous further development of the solution according to the invention, it is provided that the cooling element is fluidically connected to a cooling circuit of the vehicle, in order to provide for an energy recovery.

In the case of a further advantageous embodiment of the solution according to the invention, it is provided that at least a partial area of the electronic module of the induction charging module is at least partially arranged on the cooling element, through which fluid can flow. At least a partial area of the electronic module of the induction charging module can thereby be at least partially joined thermally to the cooling element, through which fluid can flow. A thermal connection can be provided between the electronic module and the cooling element, through which fluid can flow.

In the case of a further advantageous embodiment of the solution according to the invention, it is provided that a cooling element, through which fluid can flow, at least partially forms a shield device and/or a shield unit for the electromagnetic shielding.

In the case of a further advantageous embodiment of the solution according to the invention, it can be provided that a partial area of the electronic module of the induction charging module at least partially forms the cooling element, through which fluid can flow.

In the case of a further advantageous embodiment of the solution according to the invention, it can be provided that the induction charging module, in particular the housing, is configured separately from the shield element, and/or that the induction charging module, in particular the housing, is configured separately from the sub-surface protection.

In the case of a further advantageous embodiment of the solution according to the invention, it can be provided that the shield element has larger dimensions than the induction charging module and/or that the sub-surface protection has larger dimensions than the induction charging module.

In the case of a further advantageous embodiment of the solution according to the invention, it can be provided that the recess partially or completely permeates the shield element, in particular that the recess completely permeates the shield element, and forms an opening area and/or a material aperture area and/or a material recess area and/or an insertion opening.

The recess can completely permeate the shield element along an insertion direction, along which the induction charging module can be inserted into the insertion area, and can form an opening area and/or a material aperture area and/or a material recess area and/or an insertion opening.

The recess can form an inside opening area and/or an inside material aperture area and/or an inside material recess area and/an inside insertion opening.

In the case of a further advantageous embodiment of the solution according to the invention, it can be provided that the shield element surrounds the induction charging module in a bordering manner, in particular in a continuously bordering manner and/or in particular in a continuously bordering manner in the circumferential direction of the recess.

In the case of a further advantageous embodiment of the solution according to the invention, it can be provided that the shield element is arranged outside of the induction charging module, in particular outside of the housing, and/or that the sub-surface protection is arranged outside of the induction charging module, in particular outside of the housing.

The invention further relates to an electrically operated vehicle, such as, for example, a completely electrically driven vehicle or also a hybrid vehicle, comprising an induction charging device according to the invention. The induction charging device can be arranged in the floor area of the vehicle, so that the induction charging device is arranged as closely as possible to the driving surface. The induction charging device can be connected mechanically, fluidically and/or so as to communicate with the vehicle in a suitable manner.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
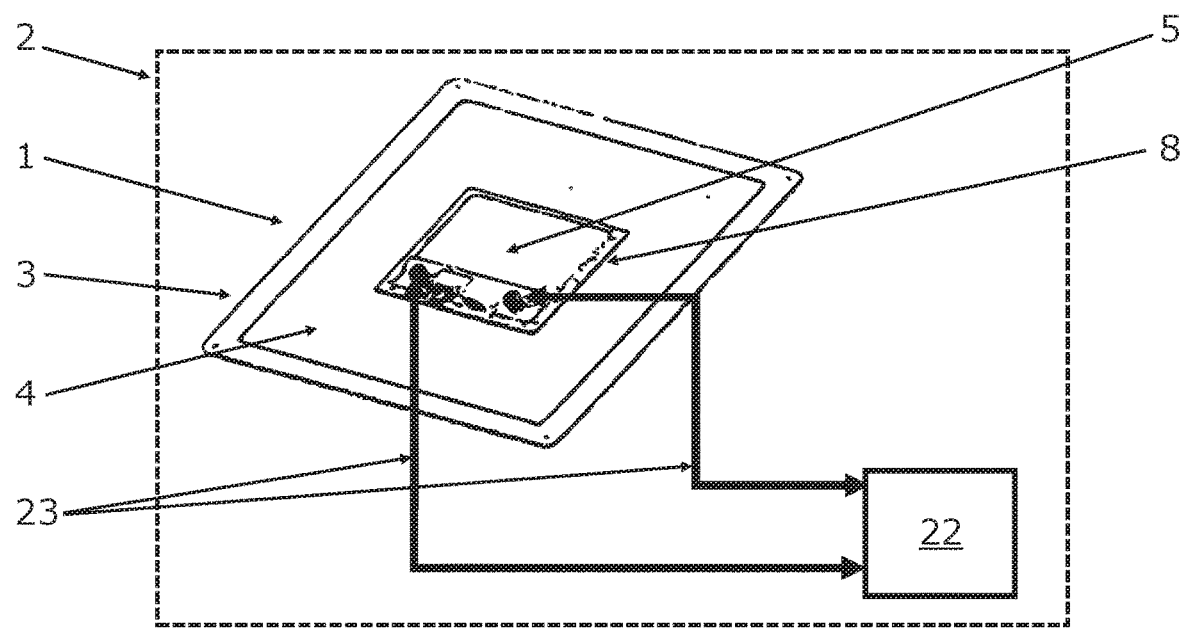
FIG. 1 shows a highly simplified view of a vehicle according to the invention comprising an induction charging device according to the invention.

A vehicle 2 according to the invention is shown in FIG. 1 in a highly simplified illustration, wherein the vehicle 2 has an induction charging device 1 according to the invention, which is fluidically connected to a cooling circuit 22 of the vehicle 2 via fluid lines 23.

The induction charging device 1 comprises a sub-surface protection 3, on which a shield element 4 is arranged. The sub-surface protection 3 and the shield element 4 each have an essentially flat design and form an insertion area 8, in which an induction charging module 5 is arranged.

Figure 2:
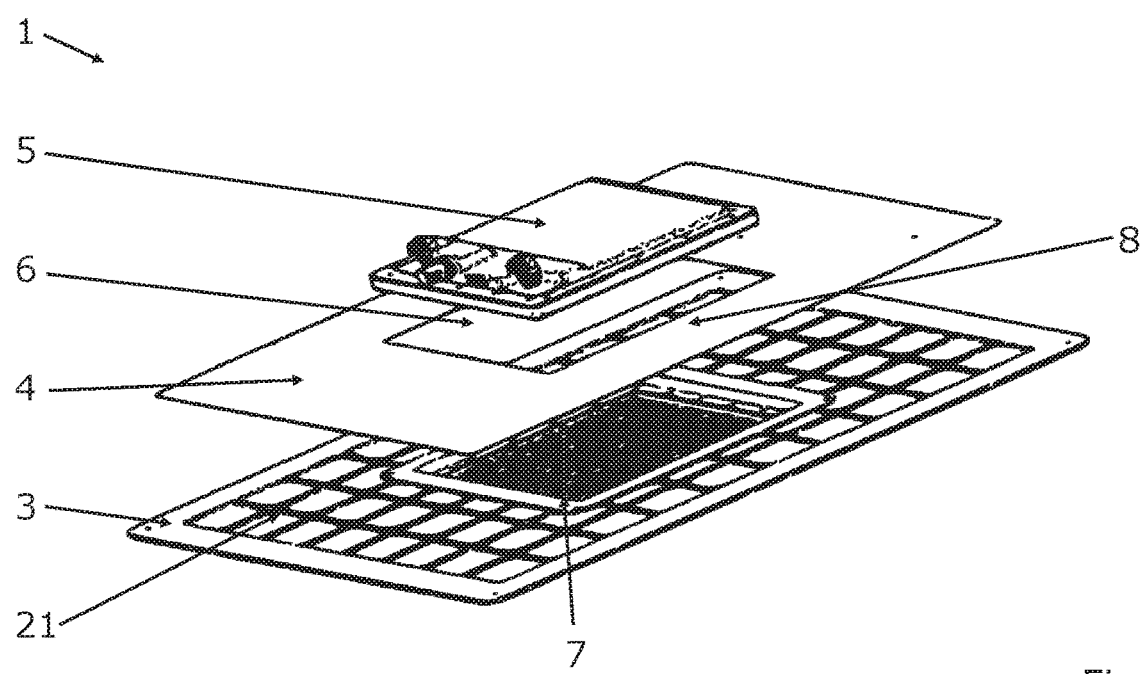
FIG. 2 shows an exploded illustration of an induction charging device according to the invention.

In FIG. 2, the induction charging device 1 is shown in an exploded illustration, in which it can be seen well that the insertion area 8 is formed by a recess 6 of the shield element 4 and by a receiving area 7 of the sub-surface protection 3. The recess 6 can be arranged essentially centrally in the shield element 4. The receiving area 7 can likewise be arranged essentially centrally in the sub-surface protection 3. In the assembled state, the recess 6 and the receiving area 7 are arranged so as to be essentially aligned and can each have a rectangular contour.

Reinforcing elements 21 of the sub-surface protection 3 can further be seen in FIG. 2, which are provided as integrally formed reinforcing grids in this embodiment.

Figure 3:
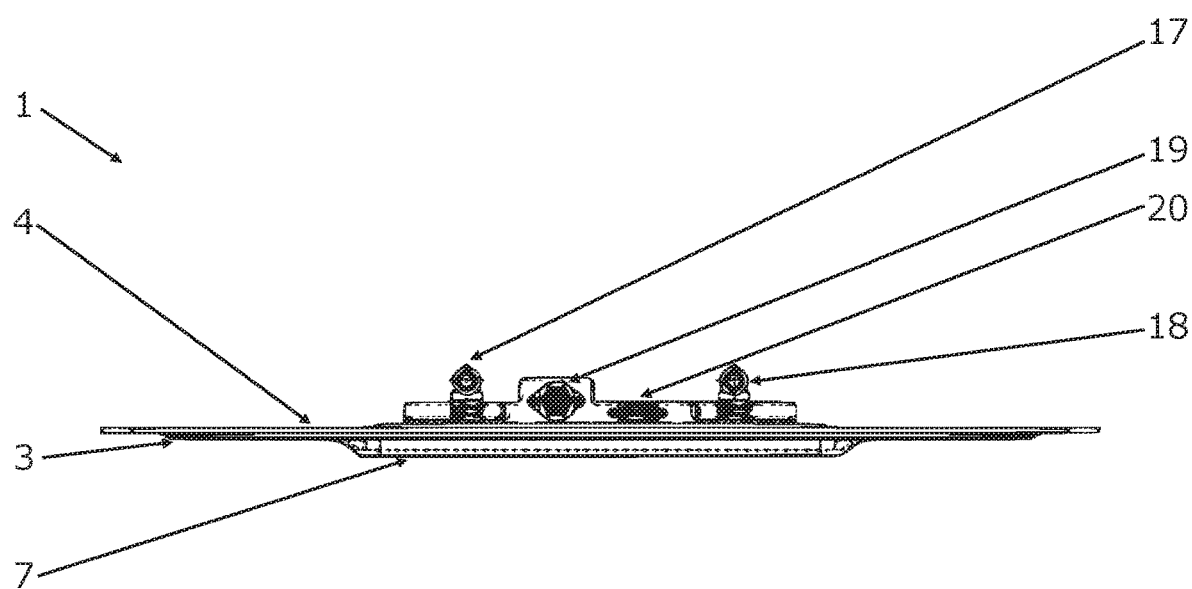
FIG. 3 shows a side view of the induction charging device according to the invention.

A side view of the induction charging device 1 is illustrated in FIG. 3, wherein the fluid inlet 17, the fluid outlet 18, the voltage connection 19, and the communication connection 20 can be seen well here.

Figure 4:
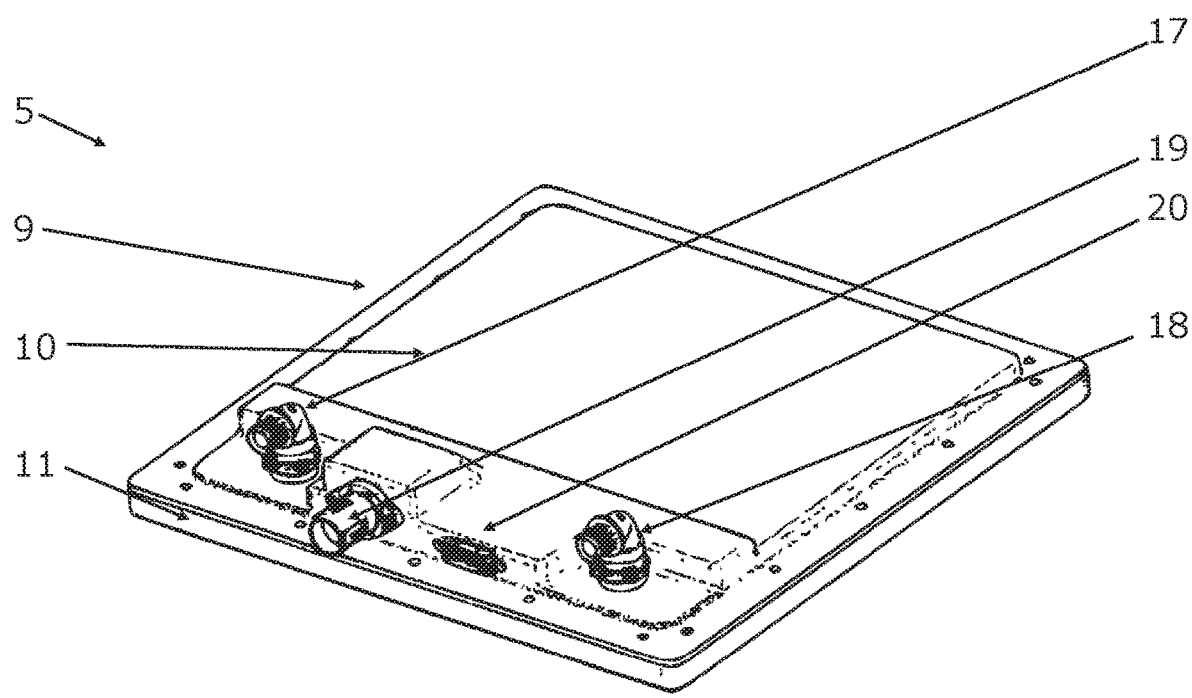
FIG. 4 shows a perspective view of an induction charging module.

A perspective view of the induction charging module 5 is shown in FIG. 4, in which the above-specified connections can once again be seen. The induction charging module 5 has a housing 9 comprising a cover 10 and a bottom 11, wherein the fluid inlet 17, the fluid outlet 18, the voltage connection 19, and the communication connection 20 are provided on the cover 10.

Figure 5:
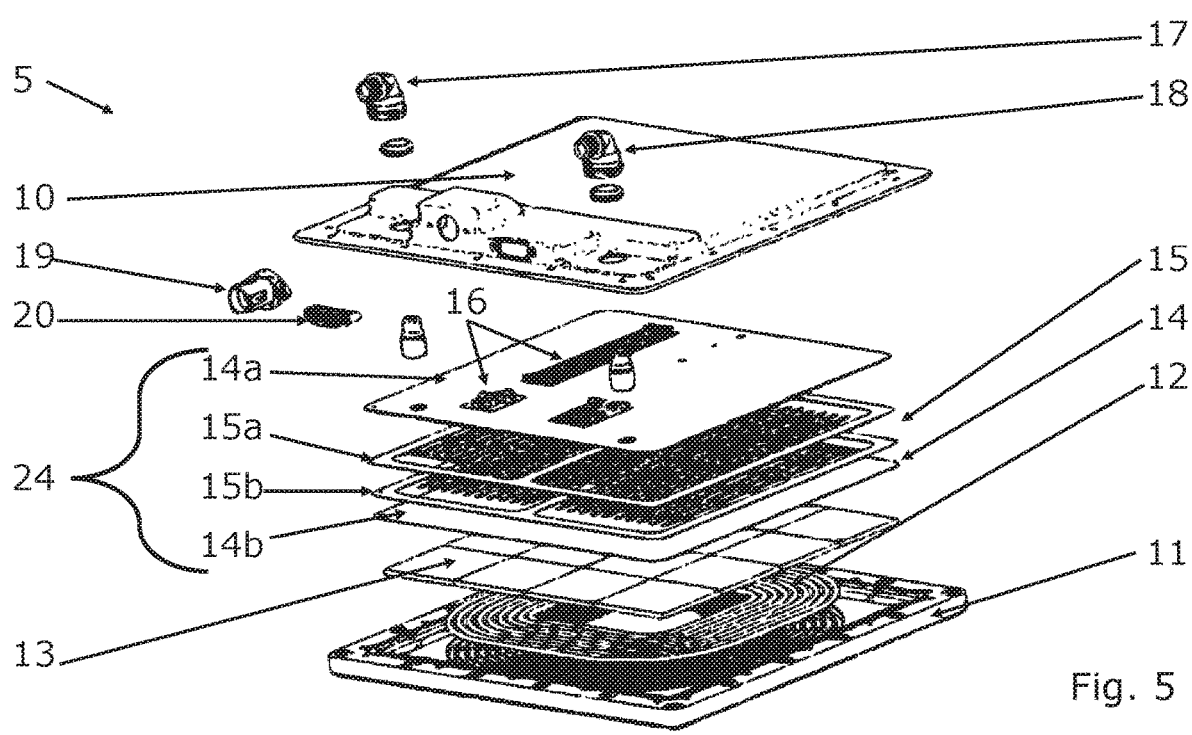
FIG. 5 shows an exploded illustration of the induction charging module.

An exploded illustration of the induction charging module 5 is shown in FIG. 5, in which it can be seen that an induction coil 12, which is provided as a helical flat coil and/or circular coil in this embodiment, is arranged between the cover 10 and the bottom 11. Between the induction coil 12 and the cover 10, a magnetic field conductor 13 is provided, which, in this exemplary embodiment, is formed of a plurality of plate elements. Between the magnetic field conductor 13 and the cover 10, a shield unit 14 is provided, which can be made, for example, as plate of an electrically conductive material. When the cooling element 24 is at least partially made of an electrically conductive metal, the cooling element 24 can simultaneously form the shield unit 14. If the cooling element 24 is made of an electrically insulating material, for example a separate shield unit 14 can be provided. The shield unit 14 can form, for example, a cooling element bottom 14b of a cooling element 24. The cooling element 24 comprises, for example, a cooling element component 15, which can be embodied of a first cooling element subcomponent 15a and of a second cooling element subcomponent 15b. The cooling element 24 can be fluidically connected to the fluid inlet 17 and the fluid outlet 18. The electronic module 16 can be thermally joined and/or attached, for example to the cooling element 24 and/or to a cooling element cover 14a of the cooling element 24. The first cooling element subcomponent 15a, the second cooling element subcomponent 15b, the cooling element bottom 14b and at least a partial area of the cooling element cover 14a can form a shield device for the electromagnetic shielding. The cooling element 24 can thereby form the electromagnetic shield effect.

One or a plurality of electronic modules 16, which can be connected to the communication connection 19 in an electrically conductive manner and to the communication connection 20 so as to communicate therewith, are provided between the cooling element 24 and the cover 10.

In combination with the sub-surface protection 3, the housing 9 can thermally insulate the induction charging device 1. The waste heat can be used and the effectiveness/the efficiency of the induction charging device 1 can be increased thereby.

The invention claimed is:

1. An induction charging device for an electrically operated vehicle, comprising:
    an induction charging module including a housing and at least one induction coil arranged inside the housing;
    a shield element including a recess;
    a sub-surface protection including a receiving area; and
    wherein the induction charging module is insertable into the receiving area via the recess and is arranged within the recess and the receiving area.

2. The induction charging device according to claim 1, wherein:
    the housing includes a bottom and a cover connected to the bottom; and
    the bottom is arranged on the sub-surface protection in the receiving area.

3. The induction charging device according to claim 2, wherein the bottom of the induction charging module at least partially forms a coil carrier.

4. The induction charging device according to claim 2, further comprising at least one magnetic field conductor arranged between the at least one induction coil and the cover.

5. The induction charging device according to claim 4, further comprising a shield unit arranged between the at least one magnetic field conductor and the cover.

6. The induction charging device according to claim 5, further comprising a cooling element, through which fluid is flowable, arranged between the at least one magnetic field conductor and the cover, wherein the shield unit at least partially forms the cooling element.

7. The induction charging device according to claim 5, further comprising an electronic module arranged between the shield unit and the cover.

8. The induction charging device according to claim 7, further comprising a cooling element, through which fluid is flowable, arranged between the at least one magnetic field conductor and the cover, wherein at least a partial area of the electronic module is at least partially arranged on the cooling element.

9. The induction charging device according to claim 4, further comprising a cooling element, through which fluid is flowable, arranged between the at least one magnetic field conductor and the cover.

10. The induction charging device according to claim 9, wherein the induction charging module further includes a fluid inlet and a fluid outlet, the fluid inlet and the fluid outlet each fluidically connected to the cooling element.

11. The induction charging device according to claim 9, wherein the cooling element is fluidically connected to a cooling circuit of the vehicle to facilitate an energy recovery.

12. The induction charging device according to claim 2, wherein the housing of the induction charging module is thermally insulating and has a heat conductivity of 8 W/(mK) or less.

13. The induction charging device according to claim 1, wherein the sub-surface protection further includes a plurality of reinforcing elements disposed around an outer periphery of the receiving area.

14. The induction charging device according to claim 1, further comprising a cooling element through which fluid is flowable, wherein the cooling element at least partially forms at least one of (i) a shield device and (ii) a shield unit for electromagnetic shielding.

15. The induction charging device according to claim 1, wherein the sub-surface protection further includes a depression that defines the receiving area.

16. The induction charging device according to claim 15, wherein:
the sub-surface protection further includes a plurality of reinforcing elements; and
the plurality of reinforcing elements are structured and arranged to form a reinforcing grid around an outer periphery of the depression.

17. The induction charging device according to claim 1, wherein the induction charging module projects through the shield element via the recess.

18. An electrically operated vehicle comprising an induction charging device including:
a sub-surface protection including a receiving area;
a shield element including a through opening, the shield element connected to the sub-surface protection such that the through opening and the receiving area define an insertion area;
an induction charging module including a housing; and
wherein the induction charging module is arranged within the insertion area and projects through the shield element via the through opening.

19. The electrically operated vehicle according to claim 18, wherein the induction charging module further includes a fluid inlet and a fluid outlet that are disposed outside of the sub-surface protection and the shield element.

20. An induction charging device for an electrically operated vehicle, comprising:
a sub-surface protection and a shield element;
an induction charging module;
a cooling element through which fluid is flowable;
the shield element including a recess;
the sub-surface protection including a receiving area;
wherein the recess and the receiving area define an insertion area in which the induction charging module is arranged; and
wherein the cooling element at least partially forms at least one of (i) a shield device and (ii) a shield unit for electromagnetic shielding.

* * * * *